United States Patent Office 3,701,691
Patented Oct. 31, 1972

3,701,691
APPLIANCE FOR THE CATALYTIC RECONSTITUTION OF HYDROGEN AND OXYGEN GASES GENERATED BY ELECTRIC ACCUMULATORS INTO WATER
Guenter Sassmannshausen, Brilon, and Norbert Lahme, Hoppecke, Westfalen, Germany, assignors to Accumulatorenwerk Hoppecke Carl Zollner & Sohn KG, Hoppecke, Westfalen, Germany
Filed Dec. 22, 1970, Ser. No. 100,602
Claims priority, application Germany, Feb. 21, 1970, P 20 08 218.2
Int. Cl. H01m 1/08
U.S. Cl. 136—179                                    5 Claims

ABSTRACT OF THE DISCLOSURE

Prior appliances for the catalytic reconstitution into water of the hydrogen and oxygen generated by electric accumulators suffer from the disadvantage that an appreciable amount of the gases or water vapour escape to the atmosphere. The invention provides a gas proof casing linked with the inside of the accumulator and containing a catalyst container inserted into the casing through an opening which is subsequently sealed by a porous element of high flow resistance. The casing may comprise the casing of the accumulator gas chamber.

---

This invention relates to an appliance for the catalytic reconstitution of hydrogen and oxygen gases generated by electric accumulators into water.

Electric accumulators generate hydrogen and oxygen gases as a result of the partial splitting-up of the electrolyte. This calls for periodical topping off with distilled water. In order to dispense with topping off altogether, or at least only to do so at extremely infrequent intervals, it has already been suggested catalytically to reconstitute into water the hydrogen and oxygen gases thus generated and to return this water to the accumulator. Appliances are known in which the hydrogen and oxygen gas mixture coming from the electrolyte of the accumulator flows through a casing open towards the outside which contains the catalyst. In the case of other appliances, the outside of the casing is provided with openings through which the air containing oxygen reaches the catalyst housed in an insert. The drawback of this system is the fact that the water vapor emitted by the surface of the catalyst as a result of the heat generated by the reconstitution of hydrogen and oxygen into water is able to escape through the opening, which considerably reduces the quantity of water which can be reconstituted. The quantity of water capable of being reconstituted is reduced further by the fact that part of the hydrogen and oxygen mixture finds its way to the outside through the openings and by-passes the catalyst. Water is also lost by evaporation from the electrolyte through the openings, particularly if the water consisting of vapour produced by the exothermic reaction at the catalyst, liquefied at the condenser surfaces, but normally warmer than the electrolyte, causes the temperature of the electrolyte to rise when returning to it.

The object of this invention is to eliminate the drawbacks described above, to ensure the return, if possible without any losses, to the accumulator of the water reconstituted from the hydrogen and oxygen emitted, and to confine the losses of electrolyte by evaporation to a minimum.

This object is achieved by the invention by virtue of the fact that the appliance for the catalytic reconstitution of hydrogen and oxygen into water and for returning the water to the accumulator consists of a gasproof casing linked with the inside of the accumulator, together with a porous catalyst container fitted inside this casing, which is linked to an opening in the casing sealed by a porous element of high flow resistance and leading to the outside.

Figure 1:
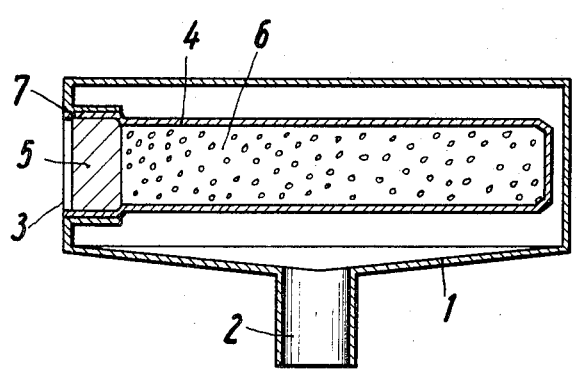
Figure 2:
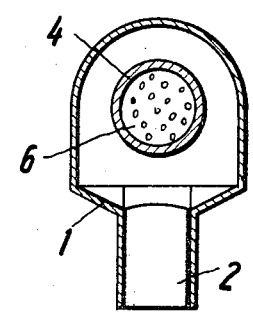

The drawings show a form of construction of the invention as follows:
FIG. 1 shows a longitudinal section of the appliance.
FIG. 2 shows a cross-section at about the center of the section of FIG. 1.

The appliance consists of casing 1 made from a heat-resistant and gasproof material, such as a thermoplastic, duromer, elastomer, ceramic or metal, or from a combination of these materials. The casing assumes the illustrated semi-cylindrical shape and its bottom slopes from the sides down to center opening 2. If necessary, the cross-section of the casing can be rectangular, circular or elliptical. Casing 1 is fitted with lateral opening 3 for the passage of catalyst container 4, one of whose extremities is situated against opening 3. Element 5 fits into opening 3 and can be sealed in a known manner, for instance with the aid of seal 7. Catalyst container 4 inside casing 1 and element 5 staling opening 3 are made from a material permeable to gas, preferably a ceramic mass. However, porous glass, porous plastics or similar materials can be used, and catalyst container 4 and sealing element 5 can also be made of different materials. Both sections can be made hydrophobic in a known manner, for instance with the aid of a silicone resin. In a preferred embodiment catalyst container 4 and sealing element 5 are of a circular cross-section which, however, can also assume a different shape, for instance rectangular or elliptical.

Catalyst container 4 houses catalyst 6 of a platinum metal, preferably mounted on supports. The manufacture of these catalysts on supports is well known.

When opening 2 of the appliance is linked with the inside, for instance by inserting or screwing an extension socket thereof into the opening of a cell, of an accumulator battery, the hydrogen and oxygen gas mixture generated when charging the accumulator flows through opening 2 into the inside of casing 1. The gas mixture reaches catalyst 6 through the wall of catalyst container 4 which is permeable to gas, where the known exothermic reaction of reconstitution of hydrogen and oxygen into water takes place. Due to the exothermic reaction, the water is in the form of vapor and behaves like a gas which flows from catalyst container 4 preferably into the feee space of casing 1. Element 5 which seals opening 3 presents a higher flow resistance than the wall of catalyst container 4. The flow resistance of element 5 must be such that a limited excess pressure prevails inside casing 1 and inside the accumulator linked to it, if a hydrogen and oxygen gas mixture continues to be supplied, for instance as a result of overcharging.

Catalyst container 4 and sealing element 5 of the example described above consist of the same porous ceramic material. However, a higher flow resistance to gas of sealing element 5 can be provided, for instance by dimensioning the cross-section or the thickness of sealing element 5 accordingly.

Another possibility of raising the flow resistance of sealing element 5 in relation to catalyst container 4 consists of reducing the pore diameter or restricting the number of pores in sealing element 5. The same object can also be achieved by making sealing element 5 and catalyst container 4 of different porous materials of different flow resistance.

Due to the greater flow resistance of sealing element 5, the water vapor generated by the hydrogen and oxygen reconstitution reaction flows into the free space of casing 1, subject only to a very slight loss, and condenses on the internal walls of casing 1. Thanks to the shape of casing 1, the water thus produced flows easily through opening 2 into the electrolyte of the accumulator. The gas mixture is prevented from escaping to the outside, without passing through the catalyst, by the construction in accordance with the invention of casing 1, catalyst container 4 and sealing element 5. This makes the appliance extremely effective. Evaporation losses of the electrolyte water are also reduced substantially while the accumulator is operating, as well as when at a standstill, particularly by sealing element 5 of higher flow resistance.

In accordance with a special form of construction of the invention, the casing of the appliance consists of the casing of the accumulator gas chamber.

The embodiments of the invention in which an exclusive property or privilege is claimed are defined as follows:

1. A device for catalytically recombining into water the oxygen and hydrogen gases from an electric storage battery comprising:
    a catalyst container,
    a catalyst in said container which is in communication with the interior of a storage battery cell through a first permeable wall means of said container;
    said container having a second wall means of lesser permeability than said first wall means communicating said catalyst with the free atmosphere.

2. The device of claim 1 in which the catalyst container is enclosed in a gas-tight housing in sealing engagement with said storage battery cell, said housing having an opening in which said second wall means is positioned.

3. The device of claim 1 in which the catalyst container is mounted in the gas accumulation area above the plates in a battery cell, said second wall means positioned in an opening in the casing of said cell.

4. A device for catalytically recombining into water the oxygen and hydrogen gases from an electric storage battery comprising:
   (a) a catalyst;
   (b) an elongated container enclosing said catalyst and having first permeable wall means;
   (c) a gas-tight housing surrounding said container and in sealing engagement with the gas accumulation area of a cell of said battery;
   (d) an opening in said housing to provide communication between the catalyst and the free atmosphere;
   (e) second wall means of lesser permeability than said first wall means in said opening so that under normal pressure conditions the oxygen and hydrogen can, through the catalyst, recombine into water and return through said first wall means, by gravity to said cell and, under over-pressure conditions the pressure can be relieved to the atmosphere through said second wall means after first passing through the catalyst.

5. The device of claim 4 in which said opening is through said housing and one end of said elongated container.

References Cited
UNITED STATES PATENTS

| | | | |
|---|---|---|---|
| 3,038,954 | 6/1962 | Pattison et al. | 136—179 |
| 3,102,059 | 8/1963 | Harmer | 136—181 |
| 3,507,708 | 4/1970 | Vignaud | 136—177 |
| 3,622,398 | 11/1971 | Sekido et al. | 136—179 |

DONALD L. WALTON, Primary Examiner

U.S. Cl. X.R.

136—181